United States Patent
Lee

(10) Patent No.: US 9,196,287 B2
(45) Date of Patent: Nov. 24, 2015

(54) OBJECTIVE LENS DRIVING UNIT AND OPTICAL PICKUP DEVICE ADOPTING THE SAME

(75) Inventor: Young-bin Lee, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/243,384

(22) Filed: Sep. 23, 2011

(65) Prior Publication Data

US 2012/0154933 A1     Jun. 21, 2012

(30) Foreign Application Priority Data

Dec. 21, 2010   (KR) .................. 10-2010-0131656

(51) Int. Cl.
*G02B 7/02* (2006.01)
*G11B 7/09* (2006.01)

(52) U.S. Cl.
CPC ............ *G11B 7/0932* (2013.01); *G11B 7/0935* (2013.01)

(58) Field of Classification Search
USPC ......................... 359/811, 813, 815, 819–822
See application file for complete search history.

(56) References Cited

U.S. PATENT DOCUMENTS

| 4,176,955 | A | * | 12/1979 | Yamada et al. | ............ | 356/222 |
| 5,999,342 | A | * | 12/1999 | Okada et al. | ............ | 359/813 |
| 6,768,601 | B2 | * | 7/2004 | Ju | ............ | 359/824 |
| 7,464,389 | B2 | * | 12/2008 | Song et al. | ............ | 720/681 |
| 2003/0012090 | A1 | * | 1/2003 | Kawano | ............ | 369/44.16 |
| 2004/0228230 | A1 | * | 11/2004 | Matsui | ............ | 369/44.16 |
| 2007/0101347 | A1 | * | 5/2007 | Yamada et al. | ............ | 720/658 |
| 2010/0182708 | A1 | | 7/2010 | Choi et al. | | |

FOREIGN PATENT DOCUMENTS

KR    10-2005-0017686    2/2005
KR    10-2006-0134583    12/2006

OTHER PUBLICATIONS

Korean Office Action issued Nov. 19, 2012 in counterpart Korean Patent Application No. 10-2010-0131656 (3 pages, in Korean).

* cited by examiner

*Primary Examiner* — Joseph P Martinez
*Assistant Examiner* — Brandi Thomas
(74) *Attorney, Agent, or Firm* — NSIP Law

(57) ABSTRACT

An objective lens driving unit including a moving structure to which an objective lens and a driving coil are operatively installed, a static structure which includes a magnetic circuit corresponding to the driving coil, a plurality of suspension wires each of which has a first end and a second end, the first end being operatively connected to the static structure, and the second end being operatively connected to the moving structure, and circuit boards operatively installed to the moving structure, the circuit boards including a plurality of wiring layers, wherein the wiring layers include first terminals to which the driving coil is connected and second terminals to which the second end of each of the plurality of is connected.

21 Claims, 4 Drawing Sheets

OBJECTIVE LENS DRIVING UNIT AND OPTICAL PICKUP DEVICE ADOPTING THE SAME

CROSS-REFERENCE TO RELATED PATENT APPLICATION

This application claims the benefit of Korean Patent Application No. 10-2010-0131656, filed on Dec. 21, 2010, in the Korean Intellectual Property Office, the entire disclosure of which is incorporated herein by reference for all purposes.

BACKGROUND

1. Field

The following description relates to an objective lens driving unit and an optical pickup device adopting the same, and additionally, to an objective lens driving unit having an improved lens unit suspension structure and an optical pickup device adopting the same.

2. Description of the Related Art

An objective lens driving unit in an optical pickup device has a structure of a voice coil motor (VCM) and includes a static structure and a moving structure. The static structure includes a permanent magnet and a yoke; and the moving structure includes a driving coil and an objective lens. In general, the moving structure is supported by a plurality of suspension wires with respect to the static structure. The suspension wires provide an electrical connection that applies a driving voltage used in lens focusing and tracking control to the driving coil. In general, a cylindrical terminal to which the driving coil is wound is disposed in a body of the moving structure and the suspension wires are bonded to the cylindrical terminal by soldering. The conventional structure by which the driving coil and the suspension wires are connected to one cylindrical terminal prohibits further reduction in the size of a conventional objective lens driving unit. Accordingly, the connection structure of the suspension wires and the coil requires further refinement.

SUMMARY

In one general aspect, there is provided an objective lens driving unit. The objective lens driving unit includes a moving structure to which an objective lens and a driving coil are operatively installed, a static structure comprising a magnetic circuit corresponding to the driving coil, a plurality of suspension wires each of which has a first end and a second end, the first end being operatively connected to the static structure, and the second end being operatively connected to the moving structure, circuit boards operatively installed to the moving structure, the circuit boards comprising a plurality of wiring layers, wherein the wiring layers comprise first terminals to which the driving coil is connected and second terminals to which the second end of each of the plurality of is connected.

The wiring layers may extend in a direction that is the same as an extending direction in which the plurality of the suspension wires extend.

At least two adjacent terminals from among the first terminals in the wiring layers may be disposed alternately.

At least two adjacent terminals from among the second terminals in the wiring layers may be disposed alternately.

At least two adjacent terminals from among the second terminals in the wiring layers may be disposed alternately.

At least two adjacent terminals from among the second terminals in the wiring layers are disposed alternately.

The objective lens may include a bridge at one side of the circuit board for supporting the suspension wires.

The circuit boards may be disposed at opposite surfaces of the moving structure that face each other.

In another aspect, an optical pickup device is provided. The optical pickup device includes a moving structure to which an objective lens and a driving coil are operatively installed, a static structure comprising a magnetic circuit corresponding to the driving coil, a plurality of suspension wires each of which has a first end and a second end, the first end being operatively connected to the static structure, and the second end being operatively connected to the moving structure, circuit boards operatively installed to the moving structure, the circuit boards comprising a plurality of wiring layers, wherein the wiring layers comprise first terminals to which the driving coil is connected and second terminals to which the second end of each of the plurality of suspension wires is connected, and a body comprising light sources and a photodetector and supporting the static structure.

The wiring layers may extend in a direction that is the same as an extending direction in which the plurality of suspension wires extend.

At least two adjacent terminals from among the first terminals in the wiring layers may be disposed alternately.

At least two adjacent terminals from among the second terminals in the wiring layers may be disposed alternately.

At least two adjacent terminals from among the second terminals in the wiring layers may be disposed alternately.

At least two adjacent terminals from among the second terminals in the wiring layers may be disposed alternately.

The optical pickup device may include a bridge at one side of the circuit board for supporting the suspension wires.

The circuit boards may be disposed at opposite surfaces of the moving structure that face each other.

The optical pick up device may be included in an electronic device.

The electronic device may be one of a portable game console, a portable/personal multimedia player (PMP), a portable lab-top PC, a desktop PC, a high definition television (HDTV), an optical disc player, and a setup box.

Other features and aspects may be apparent from the following detailed description, the drawings, and the claims.

The present invention provides an objective lens driving unit having an improved bonding structure of a driving coil and suspension wires and an optical pickup device adopting the same.

The objective lens driving unit has an efficient connection structure of a driving coil and suspension wires and thus is excellent in a thin-type structure.

According to an aspect of the present invention, there is provided an objective lens driving unit including a moving structure to which an objective lens and a driving coil are installed; a static structure including a magnetic circuit corresponding to the driving coil; a plurality of suspension wires of which two ends thereof are fixed to the static structure and the moving structure; and circuit boards installed to the moving structure and including a plurality of wiring layers, wherein the wiring layers include first terminals to which the driving coil is connected and second terminals to which ends of the suspension wires are connected.

The wiring layers are extended in an extending direction of the suspension wires.

At least two adjacent terminals from among the first terminals in the wiring layers are disposed alternately.

At least two adjacent terminals from among the second terminals in the wiring layers are disposed alternately.

At least two adjacent terminals from among the second terminals in the wiring layers are disposed alternately.

At least two adjacent terminals from among the second terminals in the wiring layers are disposed alternately.

The objective lens driving unit further includes a bridge at one side of the circuit board for supporting the suspension wires.

The circuit boards are disposed at opposite surfaces of the moving structure that face each other.

According to another aspect of the present invention, there is provided an optical pickup device including a moving structure to which an objective lens and a driving coil are installed; a static structure including a magnetic circuit corresponding to the driving coil; a plurality of suspension wires of which two ends thereof are fixed to the static structure and the moving structure; circuit boards installed to the moving structure and including a plurality of wiring layers, wherein the wiring layers include first terminals to which the driving coil is connected and second terminals to which ends of the suspension wires are connected; and a body including light sources and a photodetector and supporting the static structure.

Figure 1:
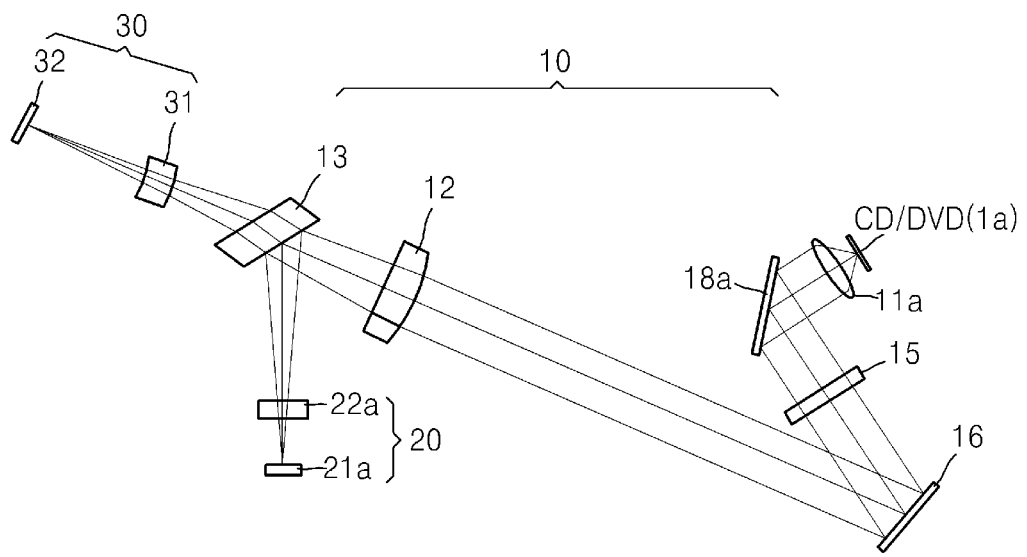
FIG. 1 is a diagram that illustrates an example of a first optical pickup device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Hereinafter, an objective lens driving unit and an optical pickup device adopting the same according to one or more examples will be described in detail with reference to the accompanying drawings.

FIG. 1 is a diagram that illustrates an example of a first optical pickup device. For example, the optical pick up device may be used to read and/or record a CD/DVD.

For example, an optical pickup device includes an optical transmission system 10 that transmits and receives light from a medium 1a, a light source system 20 for providing a plurality of beams for reproducing information from and/or recording information on the medium 1a, and a light reception system 30 for generating an electric signal required in processing of a data signal and a tracking error signal (TES). For example, the light source system 20 may provide three beams. The three beams include a center main beam and first and second sub-beams at opposite sides of the main beam. As an example, the light reception system 30 generates an electric signal corresponding to a data signal and a tracking error signal (TES) received by a photodetector 32 that may have, for example, three light receiving cells that receive three beams reflected by the medium 1a for reproducing information.

As an example, the light source system 20 includes a light source 21a for reproducing information from and/or recording information on a medium 1a such as CDs/DVDs, and a diffraction device 22a. A beam from the light source 21a may pass through the diffraction device 22a before being incident on a first beam splitter. A diffraction effect of the diffraction device 22a forms a main beam and ±first sub-beams from a single beam irradiated from the light source 21a.

As an example, the light reception system 30 includes the photodetector 32 and a sensing lens 31. The photodetector 32 detects three beams reflected by the medium 1a and passed through the second beam splitter 13 and generates an electric signal based on the detected three beams. The sensing lens 31 collects the main beam and the first and second sub-beam at both sides of the main beam with an appropriate intensity for the photodetector 32 to be able to detect the three beams.

As an example, the optical transmission system 10 may include an objective lens 11a that operatively directs a beam to or receives a beam from the medium 1a, mirrors 16 and 18a that change the optical path of the beams, a quarter wave plate (QWP) 15, a collimating lens 12, and the first beam splitter 13. The first beam splitter 13 reflects three beams from the light source system 20 toward the objective lens 11a and passes returned light, which is reflected off the medium 1a, onto the light reception system 30.

Figure 2:
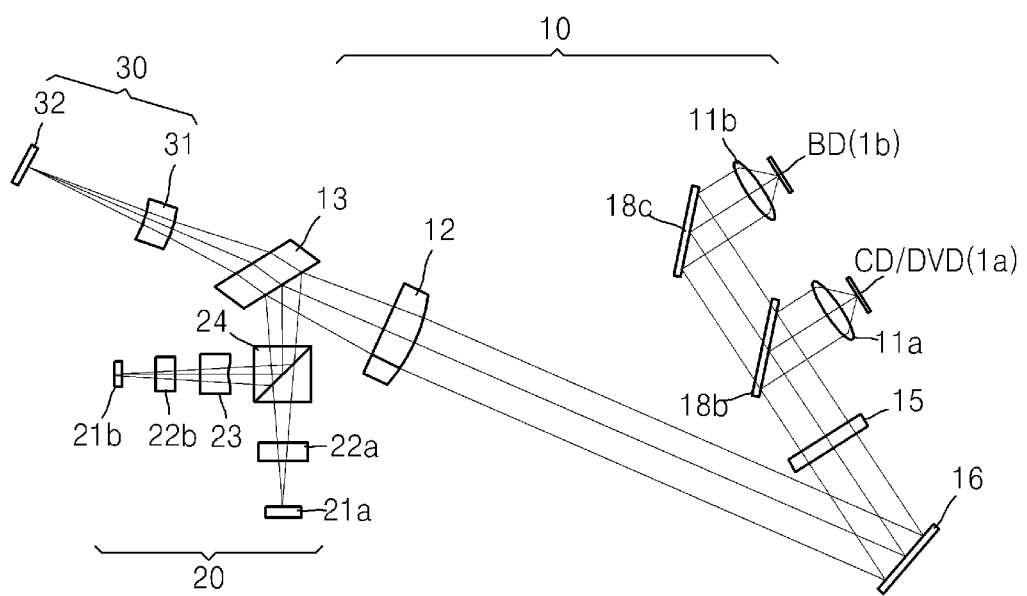
FIG. 2 is a diagram that illustrates an example of a second optical pickup device.

FIG. 2 is a diagram that illustrates an example of an optical pick up device that is compatible with an optical media. For example, the optical media may include CD/DVD/BD media. As an example, a total reflection mirror 18c may be disposed at a lower part of an objective lens 11b that operatively directs a beam to a medium 1b. For example, medium 1b may be a BD medium. The objective lens 11b is arranged for reproducing and recording to medium 1b (e.g., to BDs). A dichroic mirror 18b that allows a light having a predetermined wavelength range (e.g., light having wavelengths corresponding to blue light) to penetrate therethrough may be disposed at a lower part of the objective lens 11a that operatively directs a beam to a medium 1a. For example, medium 1a may be a CD/DVD medium. The objective lens 11a is arranged for reproduction and recording to medium 1a (e.g., to CDs/DVDs). The total reflection mirror 18c and the dichroic mirror 18b are optional elements that may be disposed on an optical progression path from mirror 16 for changing an optical path. The mirror 16 for changing an optical path reflects light from the first beam splitter 13 toward the dichroic mirror 18b and reflects light that is reflected off the media 1a and 1b toward the first beam splitter 13.

As an example, the light source system 20 may include a plurality of light sources respectively corresponding to the light sources for reproduction or recording to media 1a and 1b. For example, a light source 21b corresponds to a light source for reproduction or recording to BDs, and the light source 21a corresponds to a light source for reproduction or recording to CDs/DVDs. For example, light source 21b and the light source 21a irradiate light respectively to different incident surfaces of a second beam splitter 24. The second beam splitter 24 may have a cubic structure. A coupling lens 23, which adjusts an optical distance from the light source 21b to the medium 11b by adjusting an optical magnification may be interposed between the light source 21b and the second beam splitter 24. The optical distance from the light source 21b to the medium 11b may be adjusted by defocusing an amount of progressing light. Light incident on the second beam splitter 24 from the light sources 21a and 21b progresses to the first beam splitter 13 through the second beam splitter 24. A diffraction device 22b (e.g., a grating) that diffracts light transmitted to medium 1b (e.g., to BDs) forms a main beam and ±first sub-beams and the diffraction device 22a that diffracts light transmitted to medium 1a (e.g., to CDs/DVDs) may be respectively interposed between the second beam splitter 24 and the light source 21b and between the second beam splitter 24 and the light source 21a. An interval between the main beam and the ±first sub-beams varies based on an interval of a lattice of the diffraction device.

Figure 3:
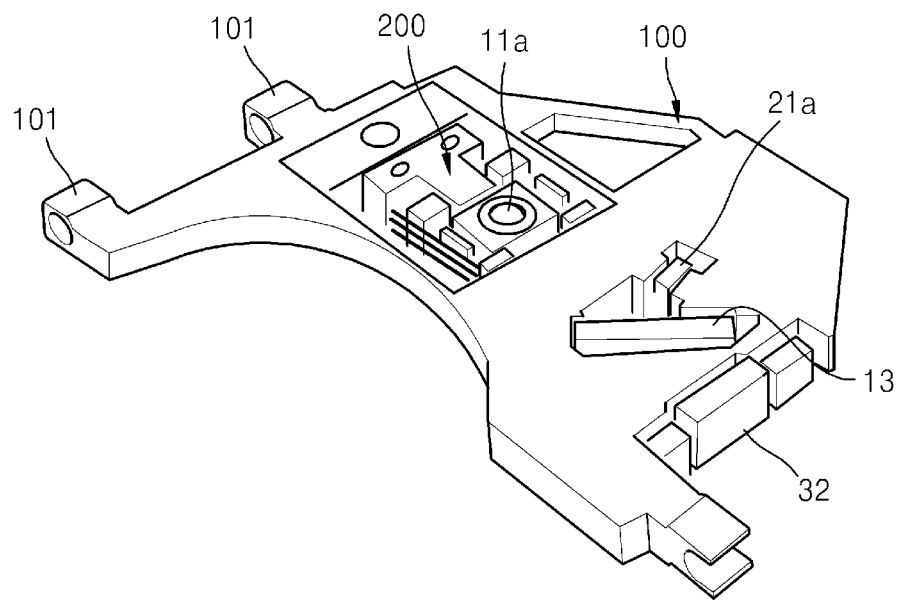
FIG. 3 is a diagram that illustrates an example of the optical pickup device of FIG. 1.

The example of an optical pickup device described above is one assembly and may have the form as illustrated in FIG. 3. FIG. 3 is a diagram that illustrates an example of the optical pickup device of FIG. 1. As an example, the optical pickup device may be used for CDs/DVDs.

Referring to FIG. 3, a body 100 having a predetermined thickness includes a space for containing a plurality of optical components. For example, the body 100 may be formed by aluminum die casting, plastic molding, or the like.

An objective lens driving unit 200, to which an objective lens 11a is installed, is included in the body 100. Also, optical components, for example, the second beam splitter 13, the light source 21a, and the photodetector 32, may be inserted and fixed to the body 100. For example, an arrangement of the optical components inserted and fixed to the body 100 may be in the arrangement illustrated in FIG. 1. In addition, a shaft guiding unit 101 having a cylindrical hole in which a guide shaft of an optical disk drive device is inserted is formed at one side of the body 100.

Figure 4:
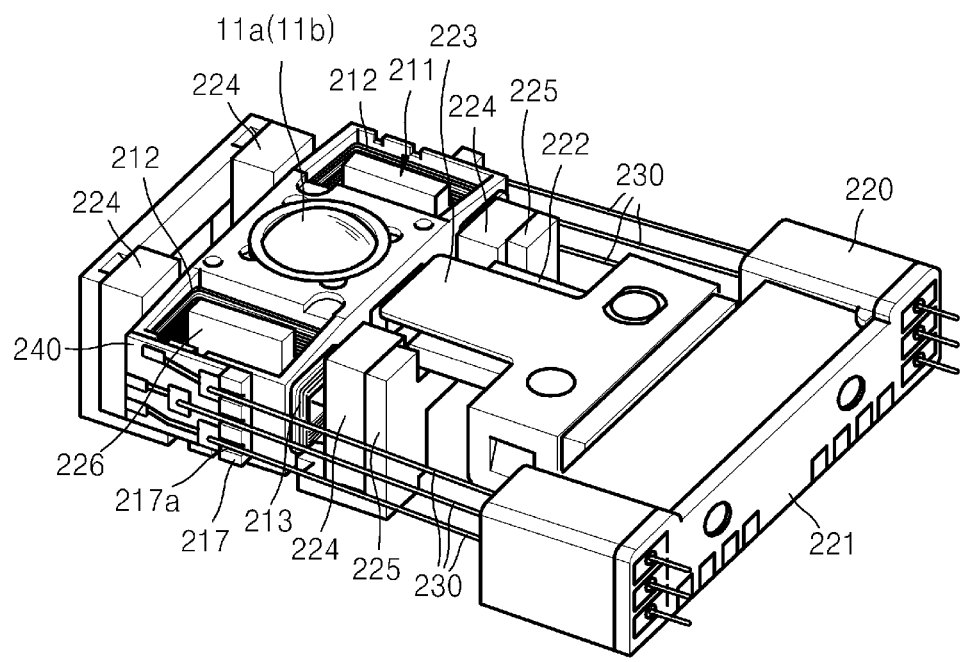
FIG. 4 is a diagram that illustrates an example of an objective lens driving unit employed in the optical pickup device of FIG. 1.
Figure 5:
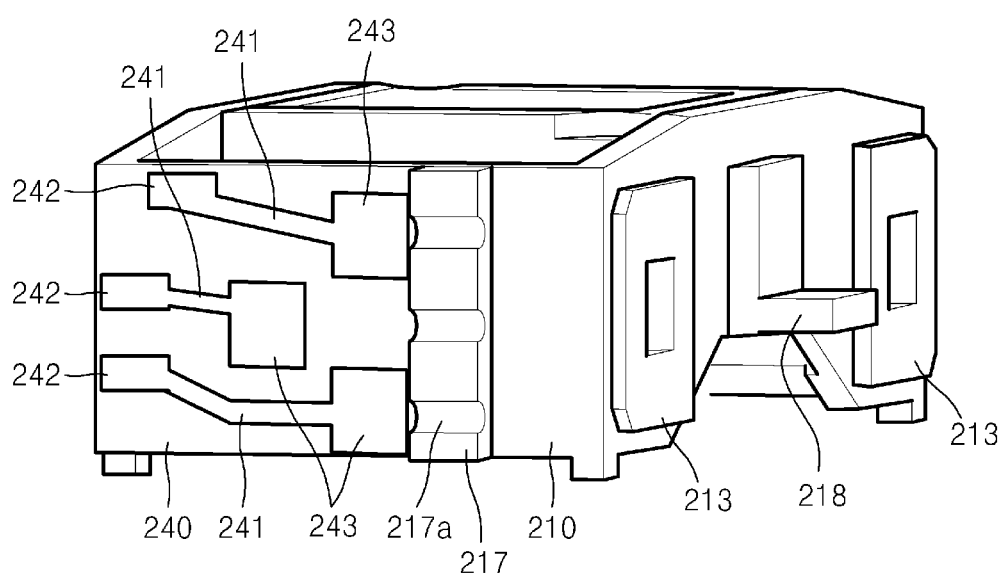
FIG. 5 is a diagram that illustrates an example of a body of a moving structure in the objective lens driving unit of FIG. 4.

FIG. 4 is a diagram that illustrates an example of the objective lens driving unit 200 employed in the optical pickup device of FIG. 1. Referring to FIG. 4, the objective lens 11a is installed at an upper center of a body 210 of a moving structure, an example of which is illustrated in FIG. 5, in the form of a square frame having square penetration holes 211, at opposite sides thereof. A cylindrical square driving coil 212 for focusing the objective lens 11a is included in the square penetration holes 211. Further, a center yoke 226 corresponding to the driving coil 212 is disposed at a center of the square penetration holes 211.

A static structure may include permanent magnets 224 disposed to surround the body 210 of the moving structure, peripheral yokes 225 for supporting the permanent magnets 224, and center yokes 226 disposed in the square penetration holes 211. The peripheral yokes 225 and the center yokes 226 may be formed as a single body. A connection member 222 extended from one side of the single body may be operatively connected to a wire holder 220. The static structure including a wire holder 220, the peripheral yokes 225, the center yokes 226, and the permanent magnets 224, supports the moving structure through suspension wires 230. A terminal board 221 may be disposed at a rear surface of the wire holder 220. The terminal board 221 may supply an electric signal to the driving coil 212. One end of the suspension wires 230 that penetrate the wire holder 220 may be fixed to the terminal board 221.

As an example, the other ends of the suspension wires 230 may be fixed to circuit boards 240 disposed at opposite surfaces of the body 210 of the moving structure. For example, as illustrated in FIG. 4, the circuit boards 240 are attached on opposite sides of the body 210. The circuit boards 240 electrically connect the driving coil 212 to the suspension wires 230 and fix the suspension wires 230. A bridge 217 that is integrally formed with the body 210 may be disposed at one side of the circuit board 240. A groove 217a of the bridge 217 supports the suspension wires 230. One end of the suspension wires 230 is fixed to the circuit board 240 by, for example, soldering.

A "T" shaped plate 223 may be disposed on the connection member 222 limits a rising height of the body 210 of the moving structure. Further, with reference to FIGS. 4 and 5, the "T" shaped plate 22 is a stopper by which a protrusion member 218 of the body 210 is stopped.

Figure 6:
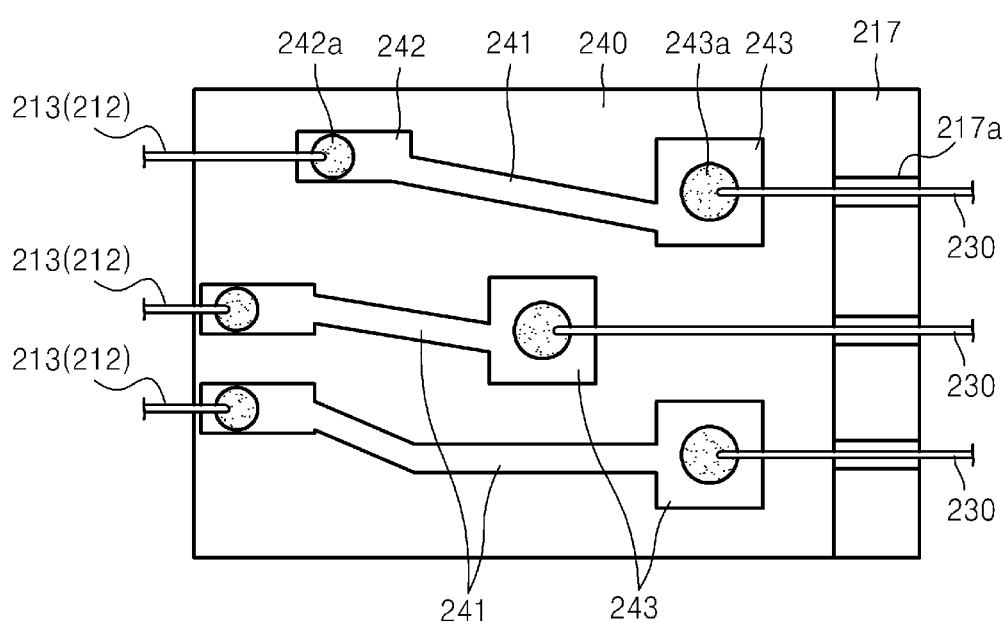
FIG. 6 is a diagram that illustrates an example of a static structure of a driving coil and suspension wires in an objective lens driving unit.

FIG. 5 is diagram that illustrates an example of the body 210 of the moving structure in the objective lens driving unit 200 of FIG. 4. FIG. 6 is a diagram that illustrates a static structure of a driving coil and suspension wires in an objective lens driving unit. For example, FIG. 6. Illustrates a bonding structure that bonds at least one of the driving coil 212 and the suspension wires 230 on the circuit board 240.

As illustrated in the drawings, the circuit board 240 may be disposed at a side of the body 210 of the moving structure, the protrusion member 218 may be disposed at a center of a surface of the body 210 facing the wire holder 220 of the static structure, and driving coils 213 for tracking an objective lens may be disposed at opposite sides of the protrusion member 218, wherein, as illustrated in FIG. 4, the permanent magnet 224 faces the driving coils 213. Ends of the driving coils 213 may be respectively bonded to first terminals 242 disposed at one end of wiring layers 241 by soldering 242a. Also, as illustrated in FIGS. 4 and 6, ends of the suspension wires 230 may be respectively bonded to second terminals 243 disposed at other ends of wiring layers 241 by soldering 243a.

As illustrated in FIG. 6, the suspension wires 230 and driving coils 213 and 212 respectively corresponding to the suspension wires 230 may be electrically connected to each other through first and second terminals 242 and 243 disposed at opposite ends of the wiring layer 241.

According to such an example structure, the driving coils and suspension wires are connected to each other by the wiring layer disposed in an extension direction of the suspension wires. Thus, it is easy to slim the moving structure. The first terminals and the second terminals are formed alternately, and in particular, two adjacent terminals are formed alternately. In this regard, it may be convenient to maximize a space for bonding the ends of wiring layers fixed by soldering and the suspension wires, in particular, sizes of the terminals.

According to one example, provided is an objective lens driving unit having an improved bonding structure of a driving coil and suspension wires and an optical pickup device adopting the same.

With an improved connection structure of a driving coil and suspension wires, thickness of the optical pickup unit and an objective lens driving unit may be reduced.

As a non-exhaustive illustration only, a device described herein may refer to mobile devices such as a portable game console, a portable/personal multimedia player (PMP), a portable lab-top PC, and devices such as a desktop PC, a high definition television (HDTV), an optical disc player, a setup box, and the like capable of wireless communication or network communication consistent with that disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An objective lens driving unit, the objective lens driving unit comprising:
   a moving structure to which an objective lens and a driving coil are operatively installed;
   a static structure comprising a magnetic circuit corresponding to the driving coil;
   suspension wires each comprising a first end operatively connected to the static structure and a second end operatively connected to the moving structure, wherein the static structure supports the moving structure through the suspension wires; and
   first and second circuit boards operatively installed to the moving structure, the first and second circuit boards comprising wiring layers, wherein the wiring layers comprise first terminals to which the driving coil is connected and second terminals to which the second end of each of the suspension wires is connected, wherein two adjacent terminals from among the first terminal and two adjacent terminals from among the second terminals in the wiring layers are disposed alternately such that the two adjacent terminals from among the first terminals are not aligned along any cartesian axes and the two adjacent terminals from among the second terminals are not aligned along any of the cartesian axes.

2. The objective lens driving unit of claim 1, wherein the wiring layers extend in a direction that is the same as an extending direction in which the suspension wires extend.

3. The objective lens driving unit of claim 1, further comprising a bridge at one side of the first and second circuit boards for supporting the suspension wires.

4. The objective lens driving unit of claim 1, wherein the first and second circuit boards are respectively disposed at opposite surfaces of the moving structure that face each other.

5. An optical pickup device, the optical pickup device comprising:
   a moving structure to which an objective lens and a driving coil are operatively installed;
   a static structure comprising a magnetic circuit corresponding to the driving coil;
   suspension wires each comprising a first end operatively connected to the static structure and a second end operatively connected to the moving structure, wherein the static structure supports the moving structure through the suspension wires;
   first and second circuit boards operatively installed to the moving structure, the first and second circuit boards comprising a wiring layers, wherein the wiring layers comprise first terminals to which the driving coil is connected and second terminals to which the second end of each of the suspension wires is connected; and
   a body comprising light sources and a photodetector and supporting the static structure, wherein
   two adjacent terminals from among the first terminal and two adjacent terminals from among the second terminals in the wiring layers are disposed alternately such that the two adjacent terminals from among the first terminals are not aligned along any cartesian axes and the two adjacent terminals from among the second terminals are not aligned along any of the cartesian axes.

6. The optical pickup device of claim 5, wherein the wiring layers extend in a direction that is the same as an extending direction in which the suspension wires extend.

7. The optical pickup device of claim 5, further comprising a bridge at one side of the first and second circuit boards for supporting the suspension wires.

8. The optical pickup device of claim 5, wherein the first and second circuit boards are respectively disposed at opposite surfaces of the moving structure that face each other.

9. An electronic device, the electronic device comprising the optical pickup device of claim 5.

10. The electronic device of claim 9, wherein the electronic device is one of a portable game console, a portable/personal multimedia player (PMP), a portable lab-top PC, a desktop PC, a high definition television (HDTV), an optical disc player, and a setup box.

11. The objective lens driving unit of claim 3, wherein the bridge further comprises grooves aligned with the suspension wires.

12. The optical pickup device of claim 7, wherein the bridge further comprises grooves aligned with the suspension wires.

13. The objective lens driving unit of claim 1, wherein the driving coil comprises a three-dimensional (3-D) cylindrical square shape and a yoke of the static structure is disposed at a center of the 3-D cylindrical square shape of the driving coil.

14. The objective lens driving unit of claim 11, wherein the grooves are disposed on only one side of the suspension wires.

15. The objective lens driving unit of claim 1, comprising a connection member connected to the moving structure and disposed between the moving structure and a wire holder through which the suspension wires extend at an end disposed opposite of the circuit board.

16. The objective lens driving unit of claim 5, comprising
   a connection member connected to the moving structure and disposed between the moving structure and a wire holder through which the suspension wires extend at an end disposed opposite of the circuit board, and
   a T-shaped plate disposed on top of the connection member that stops the body.

17. The objective lens driving unit of claim 1, the static structure comprising permanent magnets disposed on opposite sides of a protrusion member and one of the permanent magnets directly faces the driving coil, the protrusion member disposed between the suspension wires.

18. The objective lens driving unit of claim 1, wherein the driving coil surrounds a center yoke.

19. The objective lens driving unit of claim 1, wherein the driving unit extends in a direction parallel to a direction that the suspension wires extend.

20. The objective lens driving unit of claim 1, wherein a distance from one of the first terminals to a respective second terminal is different from a distance from another of the first terminals to a respective second terminal of the another of the first terminals.

21. The objective lens driving unit of claim 3, wherein one of the suspension wires extends farther past the bridge than another of the suspension wires.

* * * * *